United States Patent
Robichaux et al.

(10) Patent No.: US 6,751,534 B2
(45) Date of Patent: Jun. 15, 2004

(54) SYSTEM AND METHOD FOR PROVIDING FEEDBACK TO A DRIVER OF A HYBRID VEHICLE

(75) Inventors: Jerry D. Robichaux, Tucson, AZ (US); Peter John Grutter, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 09/746,493

(22) Filed: Dec. 21, 2000

(65) Prior Publication Data

US 2002/0082754 A1 Jun. 27, 2002

(51) Int. Cl.[7] .................. B60L 11/00; G05D 1/00; G06F 17/00; B62D 11/00; B60K 1/00
(52) U.S. Cl. .................. 701/22; 701/41; 180/65.1; 180/65.2; 180/65.3; 340/425.5; 340/438; 340/439; 340/441; 340/459
(58) Field of Search .................. 701/22, 41; 180/65.1, 180/65.2, 65.3; 340/425.5, 438, 439, 441, 453, 459

(56) References Cited

U.S. PATENT DOCUMENTS

| 5,313,191 | A | | 5/1994 | Yamashita et al. | 340/439 |
|---|---|---|---|---|---|
| 5,594,411 | A | * | 1/1997 | Ono | 180/220 |
| 5,635,903 | A | * | 6/1997 | Koike et al. | 340/384.1 |
| 5,697,466 | A | * | 12/1997 | Moroto et al. | 180/65.2 |
| 5,835,605 | A | * | 11/1998 | Kunimoto | 381/61 |
| 6,356,185 | B1 | * | 3/2002 | Plugge et al. | 340/384.3 |

* cited by examiner

*Primary Examiner*—William A. Cuchlinski, Jr.
*Assistant Examiner*—Brian J Broadhead
(74) *Attorney, Agent, or Firm*—Carlos L. Hanze

(57) ABSTRACT

A feedback system 10 for use with a hybrid electric vehicle 12 having a propulsion system 14 which includes a motor/generator 16 and an internal combustion engine 20. The system 10 provides a driver of vehicle 12 with tactile, audible, visual and/or other perceivable feedback, effective to notify the driver that the powertrain 14 of the vehicle is active when the internal combustion engine 20 is stopped.

14 Claims, 2 Drawing Sheets

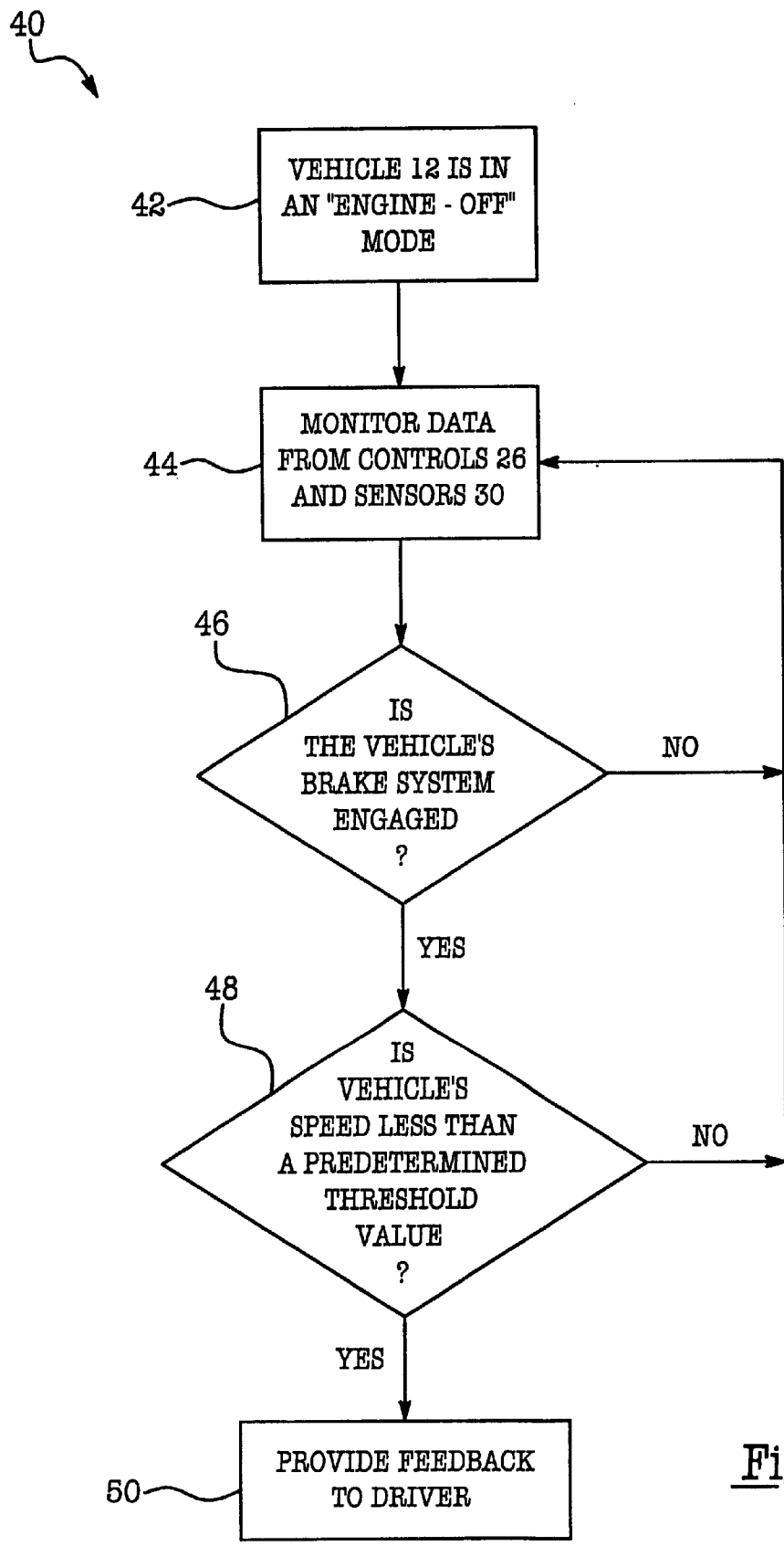

SYSTEM AND METHOD FOR PROVIDING FEEDBACK TO A DRIVER OF A HYBRID VEHICLE

FIELD OF THE INVENTION

This invention relates to a system and method for providing feedback to a driver of a hybrid electric vehicle and more particularly, to a system and a method which provides feedback to a driver when the powertrain of a hybrid electric vehicle is active and the vehicle's engine is stopped.

BACKGROUND OF THE INVENTION

A hybrid electric vehicle utilizes both an internal combustion engine and one or more electric motors to generate power and torque to the vehicle's drive train. The electric motor within a hybrid electric vehicle provides the vehicle with additional degrees of freedom in delivering the driver-demanded torque over conventional vehicles which use only internal combustion engines to deliver torque. Particularly, hybrid electric vehicles have the flexibility of using the electric motor(s) as the sole source of torque at low load operating conditions. In this manner, the vehicle is able to significantly improve fuel economy and emissions.

The electric motor(s) within hybrid electric vehicles run very "smoothly" and are often inaudible to a driver. Thus, when the engine is "turned off" or stopped during low load or idling conditions, a driver will experience very little noise or vibration. Drivers who are accustomed to conventional vehicles often expect and/or anticipate a certain level of noise and/or vibration when a vehicle's powertrain is active. This noise and/or vibration is typically produced by the idling of the vehicle's internal combustion engine. However, when a hybrid electric vehicle is being braked in low load or idling conditions, and has turned off its internal combustion engine, such noise and vibration will not be experienced by a driver, due to the relatively quiet and smooth operation of the electric motor. Therefore, hybrid electric vehicles will have a different "feel" than conventional vehicles in such situations.

The present invention provides a system and a method which provides feedback to a driver of a hybrid electric vehicle when the powertrain of the vehicle is active and the vehicle's engine is stopped, thereby giving the hybrid electric vehicle a "feel" similar to a conventional vehicle.

SUMMARY OF THE INVENTION

It is a first non-limiting advantage of the invention to provide a system and a method which provides feedback to a driver regarding the operational status of the vehicle's powertrain.

It is a second non-limiting advantage of the invention to provide a system and method for notifying a driver of a hybrid electric vehicle of the operational status of the vehicle's powertrain when the powertrain of the vehicle is active and the vehicle's engine is stopped.

It is a third non-limiting advantage of the invention to provide a hybrid electric vehicle including a feedback system which detects when the vehicle's engine is stopped and which provides feedback to a driver regarding the operational status of the vehicle's powertrain in response to such a detection.

According to a first aspect of the present invention, a feedback system is provided for use with a hybrid electric vehicle of the type having a drive line, an electric machine which is operatively coupled to the drive line and which selectively provides torque to the drive line, and an engine which is operatively coupled to the drive line and which selectively provides torque to the drive line. The feedback system includes a controller which is communicatively coupled to the engine and to the electric machine, the controller being effective to determine when the engine is stopped and the electric machine is in an active torque producing state, and based upon the determination to communicate signals to the electric machine, the signals being effective to cause the electric machine to transmit torque pulsations to the drive line, thereby notifying a driver of the vehicle of the active torque producing state of the electric machine.

These and other features, aspects, and advantages of the invention will become apparent by reading the following specification and by reference to the following drawings.

BRIEF DESCRIPTION OF THE DRAWINGS

FIG. 2 is a block diagram illustrating a method used by the system shown in FIG. 1 to provide feedback to the driver of the vehicle.

DETAILED DESCRIPTION OF THE PREFERRED EMBODIMENT OF THE INVENTION

Figure 1:
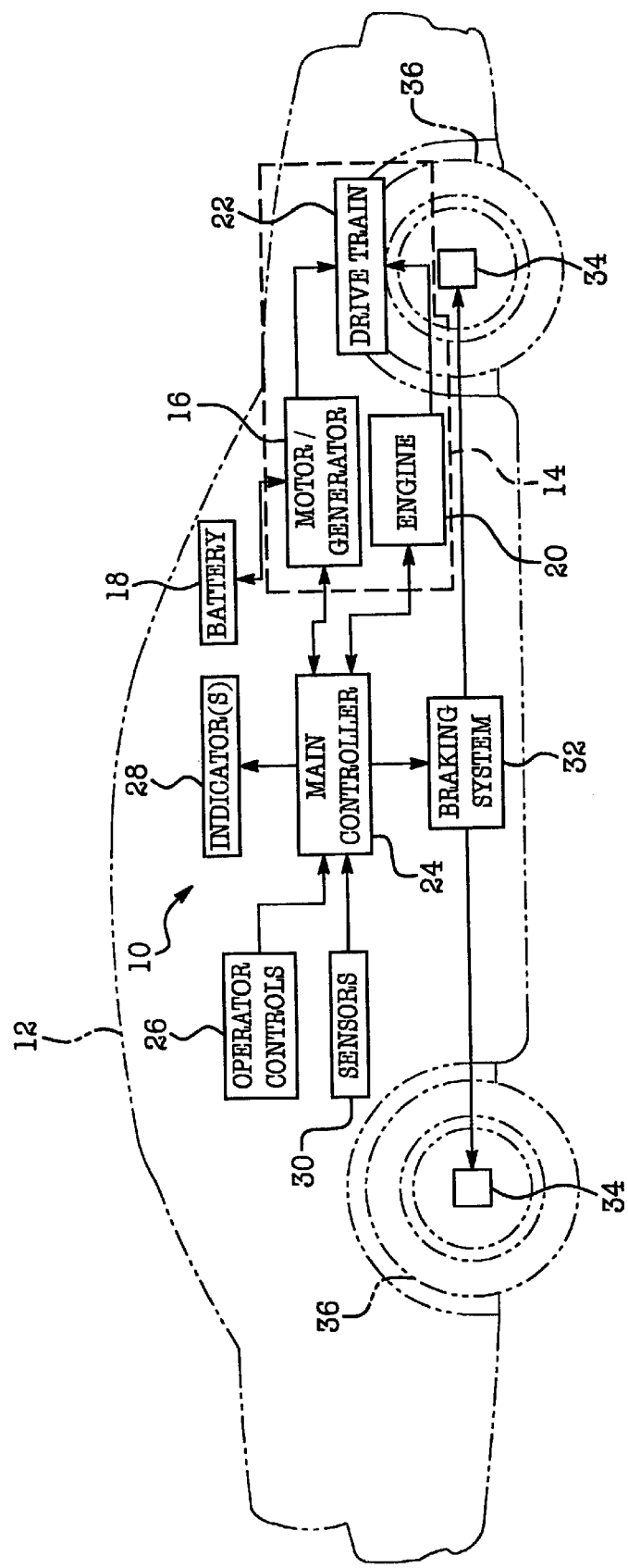
FIG. 1 is a block diagram of a hybrid electric vehicle which includes a system for providing feedback to a driver regarding the operational status of the vehicle's powertrain which is made in accordance with the aspects of the preferred embodiment of the present invention.

Referring now to FIG. 1, there is shown an automotive hybrid electric vehicle 12 having a feedback system 10 which is made in accordance with the teachings of the preferred embodiment of the present invention and which notifies the driver when the vehicle's powertrain or propulsion system 14 is activated during certain "engine off" modes or conditions (i.e., when the vehicle's internal combustion engine is stopped). Powertrain or propulsion system 14 includes an electric machine or motor/generator 16 and an internal combustion engine 20 which are each selectively and operatively coupled to the vehicle's driveline or drive train 22 (e.g., to the drive shaft of the vehicle) and which cooperatively deliver power and torque to the drive train 22, thereby powering the vehicle 12. Motor/generator 16 is operatively coupled to and selectively provides power to and receives power from a conventional electrical power supply 18, such as a battery or fuel cell.

System 10 includes a main controller or control system 24 and one or more feedback indicator(s) 28. Controller 24 is electrically and communicatively coupled to conventional user or driver operated controls or components 26 and to feedback indicator(s) 28. Main controller 24 may include and/or be communicatively coupled to separate control modules which cooperatively control the operation of propulsion system 10. For example and without limitation, controller 24 may include a conventional controller of the type which is used to control an HEV motor/generator, and a conventional controller of the type which is used to control an internal combustion engine. In one non-limiting embodiment, these controllers are embodied within a single controller, chip, microprocessor or device. Controller 24 is effective to determine the total amount of torque which is to be provided or delivered to drive train 22 and to partition or divide the total amount of torque between motor/generator 16 and engine 20. During certain low load, idle conditions and/or braking conditions, controller 24 selectively "turns off" or stops engine 20 and only provides torque to drive train 22 by use of motor/generator 16. Particularly, controller 24 determines the most efficient use of the torque providing sources (i.e., motor 16 and engine 20), and partitions or divides the demanded torque in a manner which balances fuel economy and vehicle performance (e.g., according to a predetermined strategy stored within controller 24). When the demanded torque falls below a certain predetermined level (e.g., when the vehicle is idling or is being braked), controller 24 "turns off" or stops engine 20 and provides torque to drive train 22 by use of motor/generator 16. As described more fully and completely below, controller 24 selectively activates indicator(s) 28, based upon the operating conditions of vehicle 12, effective to selectively notify the driver of the operational status of the powertrain 14.

In the preferred embodiment of the invention, electric machine 16 is a conventional electric motor/generator unit which is adapted for use in a hybrid electric vehicle. Electric motor/generator 16 is operatively coupled to the drive shaft (not shown) of the vehicle 12 in a known and conventional manner. In alternate embodiments, motor/generator 16 is operatively and conventionally coupled to other portions of the drive train or drive line 22 of the vehicle 12 (e.g., to one or more of the axles or differential gear units of vehicle 12), and to other mechanical components of vehicle 12. In other alternate embodiments, propulsion system 10 may be arranged in different configurations and may include an integrated starter/generator ("ISG") which is coupled to the engine 20 in a conventional manner (e.g., to the engine's crankshaft). Motor/generator 16 selectively provides torque to the drive shaft or drive train 22 of vehicle 12, thereby selectively powering vehicle 12. Electrical charge storage device 18 supplies power to motor/generator 16 and can further be used to recover and store energy during regenerative braking events. In alternate embodiments, motor/generator 16 may comprise a motor and a generator arranged in a conventional "dual-split" or "power-split" type hybrid configuration. Particularly, in such alternate embodiments, the engine 20 and the motor and generator are interconnected by use of a conventional planetary gear set or system, which is operatively coupled to and transfers torque and power to the vehicle's drive train 22 (e.g., to the vehicle's drive shaft).

Engine 20 is a conventional multi-cylinder internal combustion engine which includes several cylinders (e.g., four, six, eight or more cylinders). Engine 20 is operatively coupled to the driveline or drive train 22 (e.g., to the drive shaft) of vehicle 12 in a known and conventional manner and selectively provides torque to the drive train 22 of vehicle 12, thereby powering vehicle 12.

Driver operated controls 26 comprise a plurality of conventional and commercially available switches, devices and other components which accept user or driver selected inputs, thereby allowing the user or driver to operate vehicle 12. In one non-limiting embodiment of the invention, controls 26 include without limitation a vehicle "brake pedal", an accelerator or "gas pedal", a vehicle shifter which allows the driver to select between one or more operating speeds or gear engagements, and a speed control system. Controls 26 provide commands and/or operating data to controller 24 which utilizes these commands or data to determine the amount of torque which is to be delivered by powertrain 14 and to selectively cause motor 16 and engine 20 to cooperatively provide the desired torque.

Vehicle 12 further includes several conventional sensors 30 which measure and/or acquire information pertaining to vehicle 12. In the preferred embodiment of the invention, sensors 30 include one or more vehicle speed sensors which are adapted to estimate or measure the vehicle's speed and to generate signals to controller 24 representing the measured speed.

Vehicle 12 further includes a conventional friction braking system 32 which is communicatively coupled to controller 24. Braking system 32 includes conventional friction type braking members 34, such as drum or disc type members, which are actuated and/or engaged by a conventional hydraulic or electromechanical system and which act to slow and/or stop the vehicle's wheels 36.

In the preferred embodiment, feedback indicator 28 is one or more audio, visual and/or vibration notification devices, which are adapted to receive signals from controller 24 and to generate an audible, visual, or vibrational signal to a driver of vehicle 12, thereby notifying the driver of the active operational state of the powertrain 14 (i.e., whether motor/generator 16 is supplying torque to drive train 22). In one non-limiting embodiment, indicator 28 is a speaker or other sound-generating generating device which generates a "beeping", "humming", or a simulated engine noise. In another non-limiting embodiment, indicator 28 is a flashing light or other visual indicator which is operatively disposed on or within the vehicle's instrument panel or dashboard and which notifies a driver when the vehicle's powertrain 14 is active. For example and without limitation, indicator 28 may comprise a gauge which illustrates that power is being provided by motor/generator 16 to the drive train 22. In another alternate embodiment, vibration generating devices are placed in areas of the vehicle 12 which can readily transmit vibrations to the driver, such as on the steering column or within the driver's seat.

In one preferred embodiment of the invention, indicator (s) 28 are eliminated from system 10 and are replaced with a tactile feedback method in which controller 24 provides command signals to motor/generator 16, thereby causing motor/generator 16 to provide torque pulsations to drive train 22. The magnitude and frequency of the provided torque pulsations can be calibrated to be representative of the magnitude and frequency of torque pulsations generated by an idling internal combustion engine. In the preferred embodiment, as the driver releases the brake pedal and the vehicle 12 begins to move, the pulsations are gradually dampened or decreased and replaced by a continuous output torque that is proportional to the driver-demanded torque. In other non-limiting embodiments, various combinations of the aforementioned audible, visual, vibrational, and tactile feedback indicators are provided.

To better understand the operation of system 10, reference is now made to FIG. 2, which illustrates a feedback strategy or method 40 used by system 10 to selectively notify a driver of vehicle 12 of the operational status of powertrain 14 and/or motor/generator 16. Method 40 begins with step 42, when vehicle 12 is operating in an "engine off" mode. Particularly, controller 24 begins strategy 40 when engine 20 is stopped or disabled (i.e., during a low load or idling condition) and motor/generator 16 remains in an active or torque-producing state. In step 44, which follows step 42, controller 24 monitors the commands, data, and/or signals which are communicated by sensors 30 and driver operated controls 26. Based upon this received data, controller 24 determines whether the vehicle's braking system 32 is engaged (i.e., whether the vehicle is being braked), as shown in step 46. Controller 24 detects such a braking event when the operator of the vehicle 12 depresses the vehicle's brake pedal, thereby engaging braking system 32. If the brake system 32 is not engaged, controller 24 returns to step 44. Otherwise, controller 24 proceeds to step 48 and determines whether the vehicle's speed has fallen below a certain predetermined threshold value. In the preferred embodiment of the invention, the predetermined threshold value is relatively low (e.g., less than five kilometers per hour) and corresponds to a substantially stationary state of vehicle 12. If the vehicle's speed is less than the predetermined threshold value, controller 24 proceeds to step 50 and provides audible, visual, or tactile feedback to the driver of the vehicle 12. Particularly, in one embodiment, controller 24 communicates a signal to indicator(s) 28, thereby activating indicator(s) 28 and notifying the driver that the powertrain (i.e., motor/generator 12) is activated. In another embodiment, controller 24 communicates signals to motor/generator 16, effective to cause motor/generator 16 to provide torque pulsations to drive train 22 in the previously described manner. In this manner, the present invention provides a driver of vehicle 12 with feedback indicating the active torque-producing state of motor/generator 16 when engine 20 is stopped. Thus, the present system 10 gives the vehicle a "feel" similar to a conventional vehicle and/or notifies the driver of the status of the powertrain.

It should be understood that Applicant's invention is not limited to the exact method 40 which has been described herein, but that various changes and/or modifications may be made without departing from the spirit and/or the scope of Applicant's invention. For example and without limitation, in one non-limiting embodiment, step 46 is eliminated. In other alternate embodiments, method 40 may include different or additional steps and may perform the disclosed steps and/or other steps in a different order or manner.

It is understood that the invention is not limited by the exact construction or method illustrated and described above, but that various changes and/or modifications may be made without departing from the spirit and/or the scope of the inventions.

What is claimed is:

1. A feedback system for use with a hybrid electric vehicle of the type having a drive line, an electric machine which is operatively coupled to said drive line, and which selectively provides torque to said drive line, and an engine which is operatively coupled to said drive line and which selectively provides torque to said drive line, said feedback system comprising:
  a controller which is communicatively coupled to said engine and to said electric machine, said controller being effective to determine when said engine is stopped and said electric machine is in an active torque producing state, and based upon said determination to communicate signals to said electric machine, said signals being effective to cause said electric machine to transmit torque pulsations to said drive line, thereby notifying a driver of said vehicle of said active torque producing state of said electric machine.

2. The feedback system of claim 1 wherein said hybrid electric vehicle further comprises a braking system, and wherein said controller is communicatively coupled to said braking system and is further effective to determine whether said braking system is engaged and to communicate said signals to said electric machine only if said braking system is engaged.

3. The feedback system of claim 2 further comprising:
  a vehicle speed sensor which is communicatively coupled to said controller and which is adapted to measure a speed of said vehicle and to generate a data signal to said controller representing said measured speed; and
  wherein said controller is further effective to receive said data signal and to determine whether said measured speed is less than a predetermined threshold value, and to communicate said signals to said electric machine only if said measured speed is less than said predetermined threshold value.

4. The feedback system of claim 3 wherein said electric machine comprises an integrated starter/generator.

5. The feedback system of claim 3 wherein said braking system is a friction braking system.

6. The feedback system of claim 1 wherein said controller is further effective to dampen said torque pulsations as said vehicle beings to move.

7. A vehicle comprising:
  a drive train;
  an electric motor which is operatively coupled to said drive train and which selectively provides torque to said drive train;
  an engine which is operatively coupled to said drive train and which selectively provides torque to said drive train;
  an indicator which selectively generates a notification signal, said indicator comprising a torque pulse indicator; and
  a controller which is communicatively coupled to said indicator, to said electric motor and to said engine, said controller being effective to determine whether said engine is stopped and said electric motor is activated, and to selectively communicate a signal to said indicator based upon said determination, said signal being effective to cause said indicator to generate said notification signal, thereby notifying a driver that said electric motor is activated.

8. The vehicle of claim 7 wherein said indicator further comprises a visual indicator.

9. The vehicle of claim 7 wherein said indicator further comprises a audible indicator.

10. The vehicle of claim 7 wherein said indicator further comprises a vibrating indicator.

11. A method for providing feedback to a driver of a hybrid electric vehicle of the type having an electric motor/generator and an engine, said method comprising the steps of:
  monitoring an operational status of said engine and said motor/generator; and
  if said engine is in an engine off mode and said motor/generator is active, providing said feedback to said driver, effective to notify said driver that said motor/generator is active, wherein said feedback providing step comprises providing a torque pulse indication via said motor/generator and at least one of an audible indication, a visual indication and a vibrational indication.

12. The method of claim 11 wherein said vehicle further comprises a braking system, said method further comprising the step of monitoring said braking system; and wherein said feedback is provided only if said braking system is engaged.

13. The method of claim 11 further comprising the steps of:
  monitoring a speed of said vehicle; and
  wherein said feedback is provided only if said speed is less than a predetermined threshold value.

14. The method of claim 11 wherein said motor/generator comprises an integrated starter/alternator.

* * * * *